United States Patent
Mansuy et al.

(10) Patent No.: US 11,739,614 B2
(45) Date of Patent: Aug. 29, 2023

(54) METHOD OF PREVENTATIVE WATER WELL MAINTENANCE

(71) Applicant: SUBSURFACE TECHNOLOGIES, INC., Rock Tavern, NY (US)

(72) Inventors: Neil Mansuy, Kansas City, MO (US); Steven Catania, Gardiner, NY (US); Joseph Orlando, Nyack, NY (US)

(73) Assignee: SUBSURFACE TECHNOLOGIES, INC., Rock Tavern, NY (US)

( * ) Notice: Subject to any disclaimer, the term of this patent is extended or adjusted under 35 U.S.C. 154(b) by 0 days.

(21) Appl. No.: 16/461,357

(22) PCT Filed: Nov. 16, 2017

(86) PCT No.: PCT/US2017/062110
§ 371 (c)(1),
(2) Date: May 15, 2019

(87) PCT Pub. No.: WO2018/094119
PCT Pub. Date: May 24, 2018

(65) Prior Publication Data
US 2020/0056456 A1 Feb. 20, 2020

Related U.S. Application Data

(60) Provisional application No. 62/422,787, filed on Nov. 16, 2016.

(51) Int. Cl.
*E21B 37/08* (2006.01)

(52) U.S. Cl.
CPC .................................. *E21B 37/08* (2013.01)

(58) Field of Classification Search
CPC ........................................................ E21B 37/08
USPC ...................................................... 166/305.1
See application file for complete search history.

(56) References Cited

U.S. PATENT DOCUMENTS

| 6,142,232 A * | 11/2000 | Troutt ..................... E21B 37/06 166/305.1 |
| 2004/0256104 A1* | 12/2004 | Wilson .................... E21B 37/00 166/302 |

OTHER PUBLICATIONS

Subsurface Technologies Inc., Aqua Freed, 2012 (Year: 2012).*
Subsurface Technologies Inc., Aqua Gard, 2012 (Year: 2012).*

* cited by examiner

*Primary Examiner* — Matthew Troutman
*Assistant Examiner* — Patrick F Lambe
(74) *Attorney, Agent, or Firm* — Hershkovitz & Associates, PLLC; Abe Hershkovitz; Eugene C. Rzucidlo

(57) ABSTRACT

A method of preventive well maintenance with pumping equipment in the well for well rehabilitation using $CO_2$ with varying lengths of producing intervals utilizing varying methods to deliver cleaning energy and varying porosity of aquifers to determine varying quantities of energy over the entire well structure.

7 Claims, 2 Drawing Sheets

METHOD OF PREVENTATIVE WATER WELL MAINTENANCE

FIELD OF THE INVENTION

The present invention relates to an improvement in a method of preventive well maintenance with pumping equipment in the well.

BACKGROUND OF THE INVENTION

Aqua Gard® is an innovative well cleaning process that moves away from the traditional approach in the groundwater well industry of operating a well until failure. The goal of moving away from the operation until failure mentality is to target materials that build up in the near well environment (which is a natural occurrence in almost all wells) when they are soft and easy to remove. Most of the deposited material is soft until complete mineralization takes place over time. By scheduling cleaning events on a time interval approach, materials that would eventually become difficult to move are easily removed from the well, and surrounding filter pack and near aquifer.

With the installation of permanent Aqua Gard® equipment in a well, cleaning events can take place without the need to remove the pumping or injection equipment. Removal and replacement of pumping equipment during cleaning events adds a lot of downtime and cost to typical well cleaning events. The mentality of minimizing the downtime while maintaining quantity and quality of water pumped from a well is paramount to the model of protecting a well that Aqua Gard® typifies.

Aqua Gard® is a well cleaning process that utilizes natural carbon dioxide ($CO_2$), allowing easier compliance with regulatory discharge as well as better distribution of cleaning energy throughout the well, filter pack and the surrounding aquifer. Cleaning a well requires energy. Combination energies may be required to get the entire well structure cleaned effectively. Most of the energy utilized in the Aqua Gard® process is provided by the various phases of carbon dioxide ($CO_2$). The phase in which $CO_2$ occurs is a function of temperature and pressure, and in well environments, all three major phases of $CO_2$ (solid, liquid, and vapor) can occur. Aqua Gard® involves the controlled injection of liquid and vapor phases of carbon dioxide. As liquid $CO_2$ is injected into the well, the pressure and temperature encountered at the injection point do not initially provide a stable environment for liquid $CO_2$ to exist. The $CO_2$ therefore undergoes a phase change to vapor. The phase change of $CO_2$ from a liquid to a vapor can cause a volume expansion of up to 570 times. This volume expansion is one of the sources of energy that provides the cleaning action and agitation inside the well and the near well environment.

Another source of energy is the thermodynamic cooling of the water in the well due to the controlled injection of liquid $CO_2$ (liquid and solid $CO_2$ can be very cold). When the water gets cool enough, it can freeze. Solid water (ice) has a larger volume than liquid water, and the formation of ice can break up and loosen materials that are clogging pore volume in a well.

There are many different aspects to the energy delivered into a well with the Aqua Gard® process that can be utilized. Deliver energy into the well in the form of $CO_2$ liquid, and vapor resulting in phase changes of liquid to vapor, liquid to solid, and solid to vapor (sublimation) occurs. This has been demonstrated to be the most effective way to deliver energy that loosens clogging materials. The Aqua Gard® process is economical and restores the pumping capacity of a well, and eliminates the need to neutralize and dispose of chemicals that can be dangerous.

SUMMARY OF THE INVENTION

It is an object of the present invention to improve the Aqua Gard® process by providing a better distribution of effective energy into all parts of a producing interval of a well that has a long producing interval.

It is also an object of this invention to provide a challenge for distributing energy over the entire well structure. The distribution of energy into all parts of the well includes the upper casing, the producing interval of a well screen or open hole rock well, the filter pack and into the surrounding formation.

The distribution of energy can be achieved with combination energies including environmentally friendly chemicals that can be carried and distributed with the use of carbon dioxide energy in a sealed well. Carbon dioxide phase changes create agitation of the chemistries, allowing them to reach all areas of the well. Combination energies are necessary when wells have long producing intervals.

Improvements to the existing Aqua Gard® approach involve using combination energies to achieve more equal distribution of energies. The combination of chemical energy, thermal energy and mechanical energy are produced by the phase changes of liquid to vapor, liquid to solid and solid to vapor of carbon dioxide.

Chemical energy provided by National Sanitation Foundation (NSF) approved proprietary chemicals are effective on mineral solubility, and effective on biological dispersion and disinfection, metal dispersion and day dispersion. Placing chemistry in the well and utilizing the agitation of the carbon dioxide phase changes delivers the chemical energy to all portions of the well.

Quick release pulsing energy devices can be placed in the bottom of the well. These devices can store energy which can be released at high pressure, allowing disruptive energy to be released that can mobilize fines in the surrounding filter pack and formation. Once the energy is released, pressure rebuilds for another rapid release, and the cycle repeats until such time as energy is no longer introduced into the quick release device. If a pressure relief valve is selected as the energy delivery mechanism, it is selected based upon hydrostatic pressure. The pressure relief valve would utilize liquid and vapor phases of carbon dioxide, and would be designed to close after release to allow pressures to build up again.

Biological fouling and associated minerals on the surfaces within the water well environment can be measured with the use of low voltage resistive devices that can be permanently placed in the well. This would allow the cleaning cycle to be initiated when the surfaces are fouled or have evidence of deposited material.

A coating on a sensor in the low voltage resistive device would identify a change in the electrical voltage in the wires that are hooked up to the resistor. In many wells where low voltage resistive devices will not be able to be installed for various reasons, it is important to maintain the time interval approach. Presently, without resistive devices, there is no good indicator of when a well should be cleaned.

The method of calculating the specific capacity of a well is an industry standard and is still in use today as an indicator of the productive capacity of a well. Specific capacity is defined as the volume of water removed from a well per unit of drawdown (GPM/FT). As the well is operated over time, and the natural well clogging processes proceed, the specific capacity of a well will go down.

DETAILED DESCRIPTION OF THE INVENTION

Figure 1:
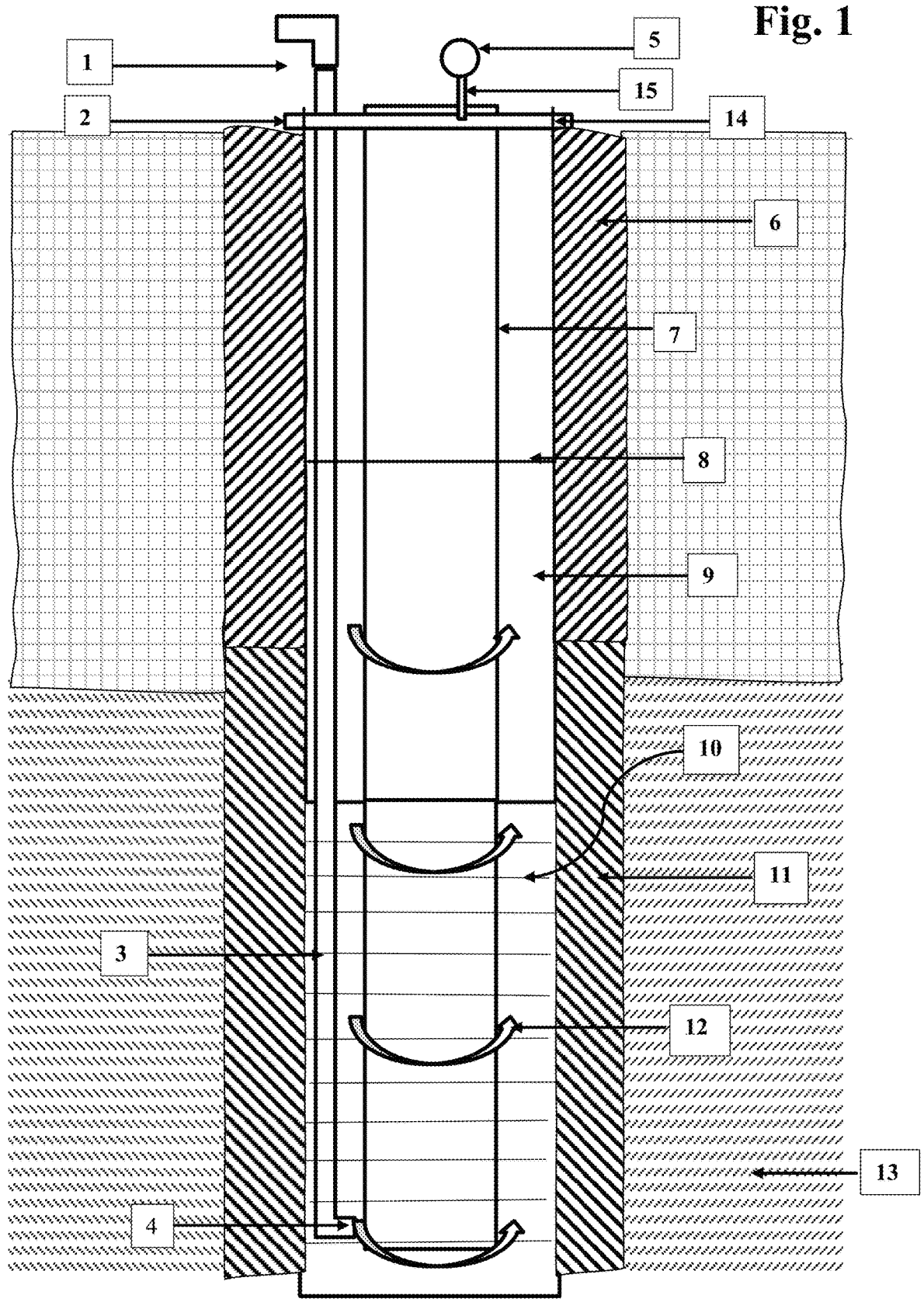
FIG. 1 shows a screened well with a filter pack with pump in the well.

FIG. 1 represents the advantage of a variable interval injection cycle. When the well is being injected with liquid $CO_2$, the water becomes supersaturated with carbon dioxide. When a transition is made at the injecting valve from liquid to vapor $CO_2$, the water that was filled with $CO_2$ releases the $CO_2$ and the water level quickly drops. Switching from liquid back to vapor results in a very sudden surge as water flows rapidly back into the well. This sudden surge back into the well can further disrupt attached material and mobilize detached clogging material as well as bringing fines from the surrounding aquifer that have invaded the pore spaces surrounding the well.

Manipulating the injection intervals of vapor and liquid improves the efficiency and the effectiveness of the cleaning process, and the surge created by the change between liquid and vapor is maximized by lengthening the liquid time intervals and shortening the vapor injection intervals.

The surging effect is caused in the well by the change in concentration of the bubbles in the well. When liquid $CO_2$ is injected into the well, the concentration of bubbles in the well is very high, and the surface of the water in the well is very agitated. The high concentration of bubbles in the well results in the movement of a high concentration of vapor upwards in the well, creating a buoyancy effect. When a transition is made in the controlled injection of $CO_2$ from the liquid phase to the vapor phase, the high concentration of bubbles becomes much lower and the water level in the well falls quickly.

Essentially, the volume in the water column that was filled with the high concentration of vapor collapses as the high concentration of $CO_2$ (liquid injection) ceases. In addition to the buoyancy effect during the liquid $CO_2$ injection, the water level in the well is forced downward with gases coming out of solution, and switching back to vapor results in water rushing back into the well, creating a surging effect. Maximizing the surging caused by the transition from liquid to vapor can be done by calculating the volume of liquid required to create the 'buoyancy' effect.

When the desired buoyancy effect is reached, a switch to the vapor injection can be made. With an understanding of the delivery pressure and flow of the $CO_2$ into the well, a timing mechanism can be used to deliver the liquid and vapor phases of $CO_2$. The control of the delivery with a timing mechanism will maximize this surging effect, ensuring that the delivery of the different phases creates the highest amount of water movement in the well.

In addition to maximizing the surging effect that the transition from liquid $CO_2$ to vapor $CO_2$ has on the water column, a greater control of the delivery of $CO_2$ to the well can maximize another form of energy delivery in the well during injection. Multiphase flow demonstrates that there are two forms of multiphase flow that the Aqua Gard® process entails.

The first form of multiphase flow is the direct delivery of $CO_2$ into the well. The $CO_2$ will travel in the delivery equipment in three different forms, vapor only, liquid only, or vapor and liquid blend, depending on how the operator controls the injection. There are a multitude of flow regimes in which a two-phase fluid will flow in a vertical water column, bubbly, slug, churn, annular, and wispy-annular. The flow regime that the fluid will flow in is based on the concentration of vapor versus liquid, as well as the velocity of the liquid in the pipe. A determination of the best way to deliver the $CO_2$ mixture will be made, and flow through the delivery pipe can be controlled with a flow control device to deliver the $CO_2$ in the method determined. The determination for the best way to deliver the $CO_2$ will be made based on which fluid flow regime provides the most effective way of creating 1) the surging effect caused by the transition of liquid to vapor in the injection process and 2) the vortex effect. The flow regime of $CO_2$ delivery would be targeted by the effect the chosen regime has on the Aqua Gard® process.

Figure 2:
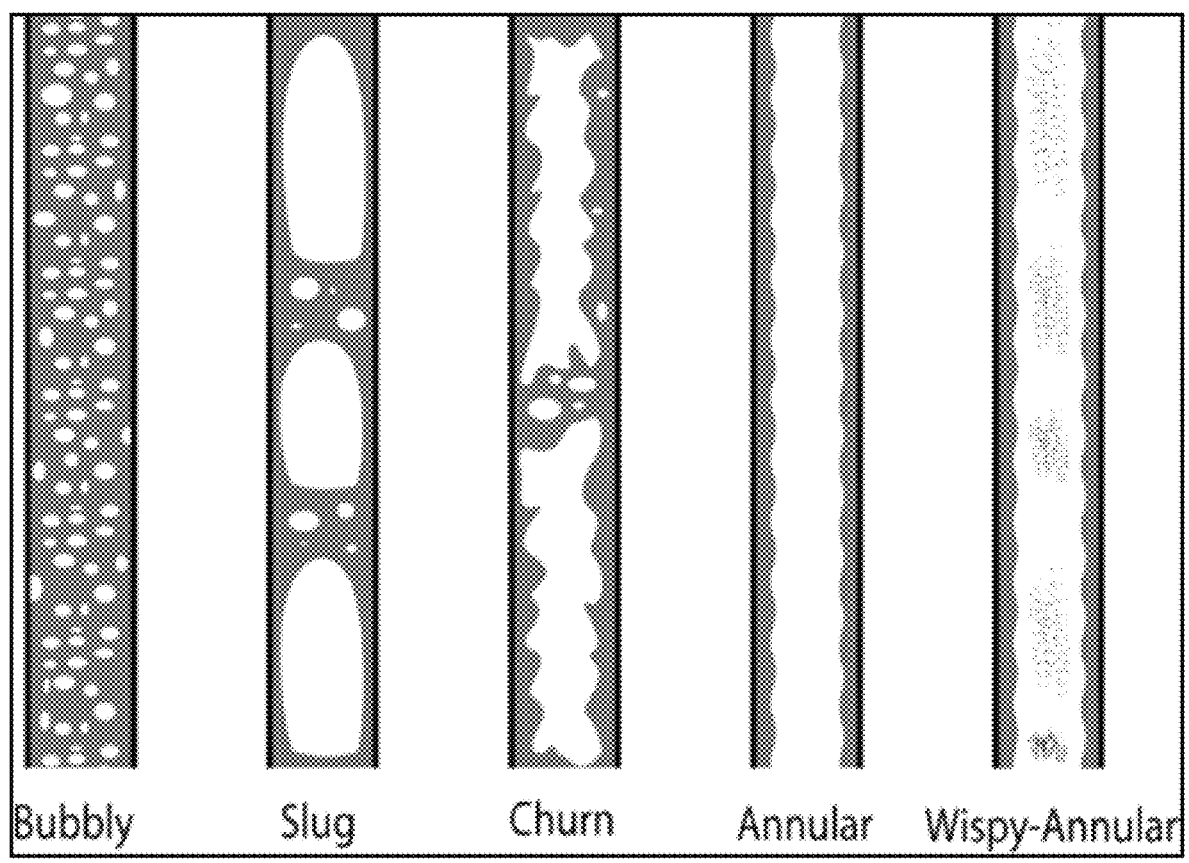
FIG. 2 is a figure representing the different flow regimes.

The second aspect is the multi-phase flow beyond the injection point. As the liquid and vapor phases enter the well, and the liquid phase changes to vapor, a new multi-phase regime is encountered where the liquid phase is the water in the well and the vapor phase is the rising $CO_2$ vapor. The goal of this second flow regime is to remove the most amount of clogging material. An inspection of FIG. 2 shows that certain flow regimes look more disruptive than other flow regimes. Particularly, the bubbly and annular regimes do not seem to be as disruptive as the slug or churn regimes. The injection would be controlled according to the multi-phase regime, which would disrupt the near well environment the most.

FIG. 1 shows a screened well with filter pack with pumping equipment in the well.

The different types of water wells can include, e.g., water supply wells, injection wells, aquifer storage and recovery (ASR) wells, recovery wells, monitor wells, collector wells, slant wells, horizontal wells, directional wells, etc.

FIG. 1 represents a very common type of water well, but many different types of wells require time based cleaning as determined by the application of the "Mansuy Principle".

The "Mansuy Principle" was established with the recognition that loss of specific capacity (discharge rate/drawdown) of a pumping well does not occur until significant clogging of pore space of the well screen 10, the filter pack 11 and the surrounding formation 13 has become significant, and the remaining pore space of a well begins to transition from laminar to turbulent flow. Loss of specific capacity in any well will occur at a precise moment.

The "Mansuy Principle" of time based cleaning is based on not detecting that exact moment of pore space plugging. The "Mansuy Principle" establishes time based cleaning of a well 10, 11, 13, 14 when deposited plugging material is often soft and easy to remove. The cleaning sequence is performed with the pumping or injection equipment in the well, and utilizing the pump to pump the detached deposits, thus minimizing equipment needed to clean a well. Wells have excess pore space when placed in production, and that exact moment of loss of specific capacity is after extensive plugging deposits have become established and the plugging deposits become mineralized and hardened, making their removal more difficult. Much of that excess pore space can be clogged but does not result in loss of specific capacity because extra pore space exists within the depth in a well 10 and extra pore space exists further into the surrounding formation 13.

Any other type of well, including open hole rock wells, would be cleaned with the claimed invention. Water wells are sealed with flange 2 or a packer placed inside well casing 14. Carbon dioxide or selected chemicals are introduced into the water well through injection line 1, 3 with pumping equipment 16, 17 in the well.

The chemicals, if used, must be approved to be placed into a water well. Carbon dioxide in various intervals cycle& is introduced into the well through injection line 1, 3, and regulated based upon injecting energy into a sealed well 2 at safe pressures, and monitored by pressure gauge 5 through a port 15. The non-pumping water level or static water level is represented by 8 in FIG. 1. Injecting carbon dioxide into a sealed well 2 does require a well to have some grout 6 around the well casing 14.

The intervals of carbon dioxide in both gaseous and liquid phase are introduced based upon the art of cleaning process to achieve maximum energy distribution. With very long screens or open hole intervals, chemical energy and carbon dioxide energy can be distributed over the entire well 10, 14 and penetrate the combination energies into the filter pack 11 and the surrounding formation 13. The energy release from phase changes of carbon dioxide is necessary to distribute energy over the entire well structure 10, 11, 14 and into the surrounding formation 13 in the zone of a water well that is plugged with mineral, biological and fine material from the aquifer.

A reduced amount of carbon dioxide and/or chemical energy is utilized with the volume displacement pipe or suction flow control device 7. The volume displacement pipe or suction flow control device 7 also directs the carbon dioxide or combination energies to where plugging deposits occur 10, 11, 13, 14. Carbon dioxide injected into a sealed well 2 through injection pipe 1, 3 through diversion elbow 4 creates a vortex 12 in the reduced annular space 9. The vortex 12 allows the combination energies to be distributed from the injection point represented by diversion elbow 4 and upward inside the well, allowing the entire well and near well to be cleaned more effectively.

The volume displacement pipe or suction flow control device 7 can reduce the amount of energy needed to clean the entire well 10, 11, 13, with less energy penetrating into the surrounding formation 14. With less energy penetrating into the surrounding formation 14, less time is required to return the well to ambient or pretreatment conditions. Following the injection of energy into the sealed well 2 with a pump 16 in the well, the gases from carbon dioxide are dissipated by allowing the energy inside the well contact time, allowing effective cleaning of the well 10, 11, 13, 14.

Usually the following day, the pump 16 is operated and the well 10, 11, 13, 14 flushed of all detached and solubilized plugging deposits. The flow sleeve or suction flow control device 7 flushes the lower zones in the well by inducing flow through the extended pump suction 7. The volume displacement pipe or suction flow control device 7, in addition to reducing the volume of energy required and directing the selected energy into the well and formation, also serves the purpose of a flow sleeve to cool submersible pump motor 17.

In addition to cooling the submersible pump motor 17, the extended flow sleeve more effectively serves the purpose of flushing the well 10, 11, 14 more effectively. More effective flushing with the use of the flow sleeve 7 leaves the well in a cleaner condition, and flushes the planktonic bacteria more effectively.

Carbon dioxide induced vortex 12 creates a swirling action in the well that can be maximized. The vortex can be beneficial in the delivery of the energy provided by the carbon dioxide, and can utilize directional flow on the injection equipment to direct flow 4 in the desired direction.

The use of drop pipe or a suction flow control device (SFCD) 7 to take up the space in the center of the well will focus the energy provided by the carbon dioxide phase change or combination energies towards the surfaces of the well and surrounding filter pack and aquifer. The vortex 12 will swirl upward in the annular space between the SFCD 7 and the well surfaces that are being cleaned. This vortex 12 can be utilized in the combination of carbon dioxide with chemical energy to further enhance the delivery of chemical energy. The smaller volume between the SFCD 7 or pump suction and the well/filter pack, well/aquifer interface would allow less carbon dioxide and/or chemicals to be utilized while achieving the desired cleaning effect. This will result in less impact on the surrounding aquifer 13, thus requiring less time to pump and flush the well in the impacted zone.

FIG. 1 shows a screened water well with a filter pack. Any other type of well, including open hole rock wells, would be cleaned with the same steps. Water wells are sealed with flange 2 or a packer placed inside well casing 14. Carbon dioxide or selected chemicals are introduced into the water well through injection line 1, 3. The chemicals, if used, must be approved to be placed into a water well. Carbon dioxide in various intervals is introduced into the well through injection line 1, 3 and regulated based upon injecting energy into a sealed well 2 at safe pressures, and monitored by pressure gauge 5 through a port 15.

The non-pumping water level or static water level is represented by 8 in FIG. 1. Injecting carbon dioxide into a sealed well 2 does require a well to have some grout 6 around the well casing 14. The intervals of carbon dioxide in both gaseous and liquid phase are introduced based upon the art of cleaning process to achieve maximum energy distribution. With very long screens or open hole intervals, chemical energy and carbon dioxide energy can be distributed over the entire well 10, 14 and penetrate the combination energies into the filter pack 11 and the surrounding formation 13. The energy release from phase changes of carbon dioxide is necessary to distribute energy over the entire well structure 10, 11, 14 and into the surrounding formation 13 in the zone of a water well that is plugged with mineral, biological and fine material from the aquifer. A reduced amount of carbon dioxide and/or chemical energy is utilized with the volume displacement pipe 7.

The volume displacement pipe 7 also directs the carbon dioxide or combination energies where plugging deposits occur 10, 11, 13, 14. Carbon dioxide injected into a sealed well 2 through injection pipe 1, 3 through diversion elbow 4 creates a vortex 12 in the reduced annular space 9. The vortex 12 allows the combination energies to be distributed from the injection point represented by diversion elbow 4 and upward inside the well, allowing the entire well and near well to be cleaned more effectively. The volume displacement pipe 7 can reduce the amount of energy needed to clean the entire well 10, 11, 13 with less energy penetrating into the surrounding formation 14. With less energy penetrating into the surrounding formation 14, less time is required to return the water well to ambient or pretreatment conditions.

IMPROVED ENERGY DISTRIBUTION
DIAGRAM ELEMENTS LIST (FIG. 1)

1: Energy Injection port
2: Well sealed with flange—Can also utilize a packer
3: Carbon dioxide and/or chemical injection line into lower part of the well
4: Energy diversion port or energy quick release valve
5: Pressure gauge to measure internal well pressure 6: Grout seal
7: Volume displacement pipe and suction flow control pipe
8: Static water level
9: Reduced annular space between well casing and screen or open hole and volume displacement pipe or suction flow control pipe
10: Well screen or borehole face of rock well
11: Filter pack or natural pack
12: Vortex created by carbon dioxide injection and directional valve
13: Consolidated or unconsolidated aquifer
14: Well casing
15: Port through sealed well
16: Well pump submersible or line shaft turbine
17: Submersible pump motor if submersible pump is installed in well
18: Drop pipe or column pipe

We claim:

1. In a method of preventative well maintenance using CO2 in a well comprising permanent equipment for well maintenance and water pumping equipment, the water pumping equipment remaining in the well during the maintenance, the improvement comprising
using the permanent equipment for well maintenance remaining in the well to inject liquid and vapor $CO_2$ into the well,
controlling $CO_2$ phase changes during $CO_2$ injection cycles by manipulating injection cycles of liquid and vapor $CO_2$ and providing a distribution of energy throughout an entire well structure including all parts of a producing interval of the well and surrounding formation,
causing a surging effect in the well by the distribution of energy, and
maintaining and distributing the surging effect throughout the entire well structure, and the surging effect being distributed by at least one energy resulting from controlling $CO_2$ phase changes during injection of the liquid and vapor $CO_2$,
wherein the at least one energy includes chemical energy, thermal energy, and mechanical energy.

2. The method of claim 1, further comprising setting a volume displacement pipe (VDP) into the well prior to carbon dioxide injection and the well comprising a well screen or borehole wall, wherein the volume displacement pipe has a smaller diameter than the well screen or borehole wall, and the VDP is adapted to displace water in the well and to direct the cleaning combination energies to the screen or fractures in a rock well.

3. The method of claim 2, wherein surging is maximized by injecting carbon dioxide in a fashion to create a vortex in an annular space between the volume displacement pipe and the well screen or borehole and casing, allowing a combination of at least two of the at least one energy to be delivered to all areas of the well.

4. The method of claim 2, comprising directing an injection nozzle for carbon dioxide at a desired angle to achieve a vortex in an annular space between the Volume Displacement Pipe (VDP) and the well screen or borehole wall, wherein the vortex distributes energy or a combination of at least two of the at least one energy throughout the well and surrounding aquifer.

5. The method of claim 1 comprising selecting a volume of carbon dioxide by evaluating a porosity of an aquifer to determine a buffering capacity of the aquifer, wherein the buffering capacity can be determined by assessment of an amount of carbonates in the aquifer and a total alkalinity of water.

6. The method of claim 1, comprising injection of carbon dioxide into a sealed well to surge the well by switching between liquid injection and vapor injection cycles, wherein a length of each cycle is calculated based upon a length of the producing interval, a volume of water in a well treatment zone and a flow rate of carbon dioxide.

7. The method of claim 1, wherein a volume of $CO_2$ is refined by determining and using a total porosity and a volume in the treatment zone inside the well, and keeping a cleaning energy confined to the producing interval and a distance horizontally from the well.

* * * * *